Patented Dec. 5, 1933

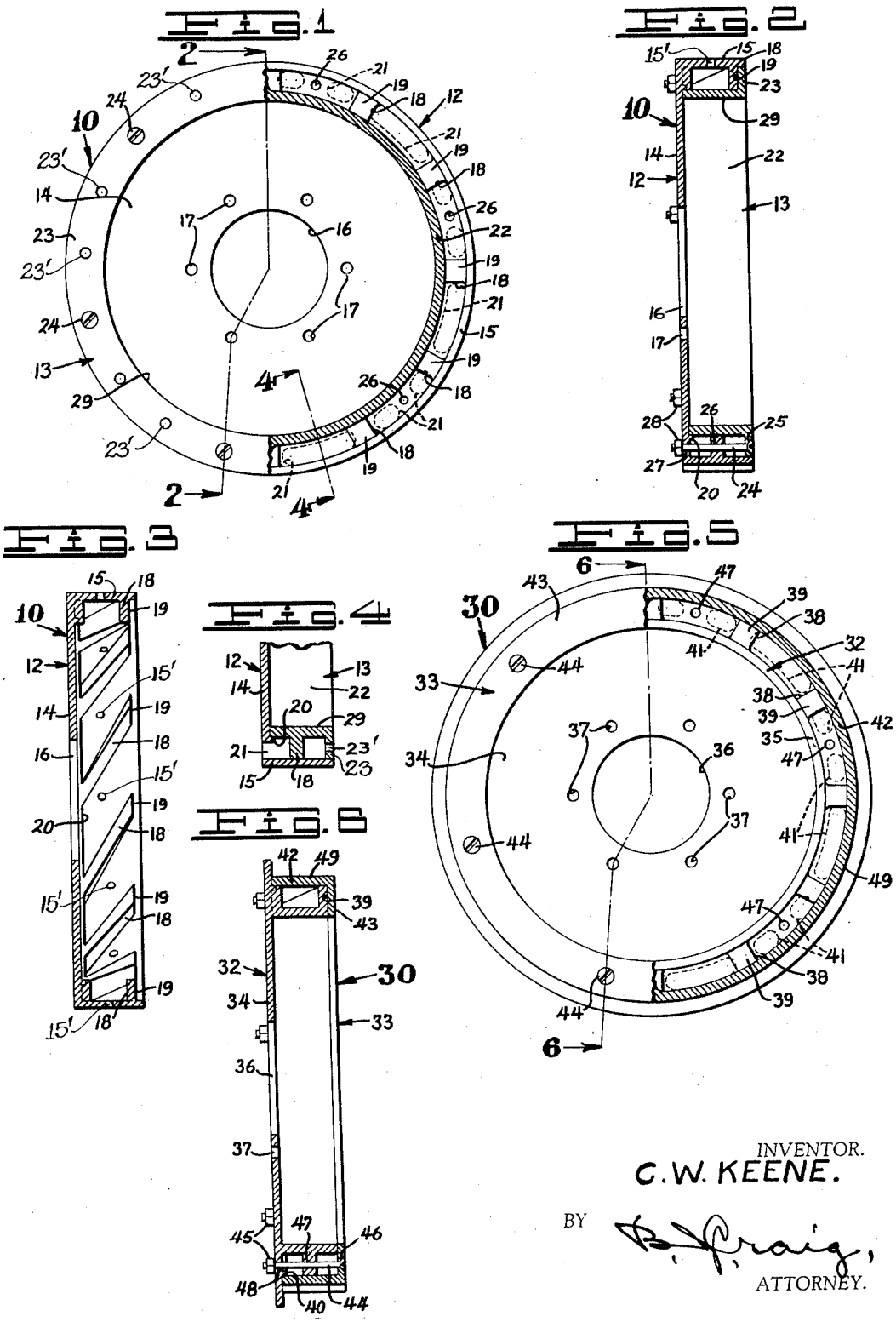

1,937,702

UNITED STATES PATENT OFFICE 1,937,702

BRAKE DRUM

Charles W. Keene, Los Angeles, Calif.

Application July 12, 1932. Serial No. 622,044

7 Claims. (Cl. 188—218)

This invention relates to improvement in brake drums.

The general object of this invention is to provide an improved two piece brake drum.

A more specific object of the invention is to provide a brake drum wherein the portion adapted to be engaged by a braking member is separate from the main portion and may be readily replaced.

A further object of the invention is to provide a brake drum construction wherein an excessive amount of pressure may be applied to the braking surface without distorting the same.

Other objects and the advantages of this invention will be apparent from the following description taken in connection with the following drawing wherein:—

Fig. 1 is a face view of my improved brake drum with portions thereof broken away.

Fig. 2 is a section taken on line 2—2 of Fig. 1.

Fig. 3 is a central section through the housing of my improved brake drum.

Fig. 4 is a fragmentary section taken on line 4—4 of Fig. 1.

Fig. 5 is a view similar to Fig. 1 showing a modified form of my invention and

Fig. 6 is a section taken on line 6—6 of Fig. 5.

This invention is a continuation in part of my prior application Serial No. 504,198, filed December 22, 1930. Although I have shown and will hereafter describe this invention as particularly adapted for use on vehicles it will be understood that it is equally applicable to any rotating device requiring to be braked.

Referring to the drawing by reference characters I have indicated my improved brake drum generally at 10. As shown the brake drum 10 comprises a housing 12 and an insert member 13. The housing 12 includes a rear wall 14 having an annular side wall 15 integral therewith. The rear wall 14 includes a central aperture 16 for the passage therethrough of an axle and surrounding the aperture 16 I provide a plurality of spaced apertures 17 in which bolts or other suitable means are adapted to be positioned for securing the housing 12 to a wheel or other rotatable member.

Spaced around the inner face of the side wall 15 I provide a plurality of ribs 18 which are formed integral with the side wall. As shown the ribs 18 extend from the rear wall 14 towards the edge of the side wall 15 at an angle and terminate short of the edge of the side wall to form seats 19. The upper ends of the ribs 18 preferably overlap the lower ends of each succeeding rib as clearly shown in Fig. 3.

Projecting from the rear wall 14 adjacent the inner ends of the ribs 18 I provide an annular flange 20 the inner surface of which is flush with the inner faces of the ribs 18. In the rear wall 14 between each of the ribs 18 I provide ventilating apertures 21 (see Fig. 4).

The insert member 13 includes an annular portion 22 having an annular flange 23 integral therewith and extending outwardly therefrom. The insert member 13 is positioned on the housing 12 with the outer face of the annular portion 22 engaging the inner faces of the ribs 18 and with the inner face of the flange 23 engaging the seat ends 19 of the ribs 18 as clearly shown in Fig. 2. When the insert member 13 is thus positioned on the housing 12 the outer surface of the annular portion 22 adjacent the inner end thereof has complete annular contact with the flange 20 of the housing.

The insert member 13 is shown as adapted to be secured to the housing 12 by a plurality of bolts 24 which are positioned in apertures 25 provided in the flange 23 and in apertures 26 provided in the ribs 18 and apertures 27 provided in the rear wall 14 of the housing. The bolts 24 have suitable nuts 28 thereon.

The brake drum 10 is adapted to be used with an expanding brake (not shown) which is adapted upon a braking operation to engage the inner face 29 of the annular portion 22 of the insert member 13. Thus during a braking operation the pressure on the annular portion 22 of the insert member 13 is outward. By providing the ribs 18 at an angle as shown the danger of warping the braking surface 29 by excessive pressure of the braking means is decreased and by providing the flange 20 on the housing the inner end of the annular portion 22 of the insert member is provided with a support which prevents distortion thereof.

The vent apertures 21 provided in the housing 12 allow air to circulate between the ribs 18 thereby cooling the annular portion 22 of the insert member 13. The flanges 15 and 23 are provided with openings 15' and 23' to provided ventilation. The ribs 18 also help to carry heat from the annular portion 22 thus assisting in cooling the braking surface.

When the braking surface 29 of the member 13 has become unduly worn or defaced the member 13 may be removed from the housing 12 by removing the bolts 24 and a new member 13 is placed on the housing 12 in much less time and at less expense than that required to resurface the brake drums commonly used at present.

In Figs. 5 and 6 I have indicated a modification of my invention generally at 30. The device 30 is substantially the same as the device 10 except that it is constructed to be used in combination with an external contracting braking means. As shown the device 30 comprises a housing 32 and an external member 33. The housing 32 includes a rear wall 34 having an annular flange 35 integral therewith and projecting therefrom. The rear wall 34 is shown as including a central aperture 36 for the passage therethrough of an axle and surrounding the aperture 36 I provide a plurality of spaced apertures 37 in which bolts or other suitable means are adapted to be positioned for securing the housing 32 to a wheel or other rotatable member.

Spaced around the outer face of the annular flange 35 I provide a plurality of ribs 38 which are formed integral with the flange 35. The ribs 38 like the ribs 18 of the device 10 are positioned at an angle and terminate short of the edge of the flange 35 to form seat portions 39.

Projecting from the rear wall 34 adjacent the inner ends of the ribs 38 I provide an annular flange 40 the outer face of which is flush with the outer faces of the ribs 38. In the rear wall 34 between each of the ribs 38 I provide vent apertures 41 similar to the apertures 21 in the rear wall 14 of the device 10.

The external member 33 includes an annular portion 42 having an annular flange 43 integral therewith and extending inwardly therefrom.

The member 33 is positioned on the housing 32 with the inner face of the annular portion 42 engaging the outer faces of the ribs 38 and with the inner face of the flange 43 engaging the seat portions 39 of the ribs. When the member 33 is thus positioned on the housing 32 the inner surface of the annular portion 42 adjacent the inner end thereof has complete annular contact with the flange 40 of the housing.

The member 33 is shown as secured to the housing 32 by bolts 44 and nuts 45. The bolts 44 are positioned in apertures 46 provided in the flange 43 of the member 33 and pass through apertures 47 in the ribs 38 and apertures 48 provided in the rear wall 14 of the housing. As previously mentioned the brake drum 30 is adapted to be used with an external brake (not shown) which is adapted upon a braking operation to engage the outer face 49 of the annular portion 42 of the member 33.

The functions of the various elements of the device 30 are similar to the previously described functions of the corresponding elements of the device 10.

From the foregoing description it will be apparent that I have provided a novel brake drum which is simple in construction and highly efficient in use. In my brake the reenforcements constituting the ribs add strength while at the same time less material is required in manufacture. With my brake drum distortion which is the cause of grabbing and chattering is prevented and as the drum is made in two sections vibration is eliminated. These advantages are in addition to that of quick and economical replacement of the wearing parts.

Having thus described my invention, I claim:

1. In a brake drum, a wall portion having a flange thereon, said flange having ribs cast upon its inner periphery and an insert positioned within said flange and engaged and concentrically spaced therefrom by said ribs, said insert including a flange member having a plurality of concentrically arranged holes therein, a plurality of removable fastening members in said holes, said fastening members engaging said first mentioned flange for securing the insert to said ribs, said flanges having openings therein for ventilating the space therebetween.

2. In a brake drum, a housing, said housing including a wall having a flange projecting therefrom, a plurality of spaced ribs on the inner face of said flange, said ribs including seat portions, an insert member, said member including a cylindrical portion having an annular flange projecting outwardly therefrom, said insert member being positioned on said housing with the inner face of said flange portion thereof engaging said seat portion of said housing ribs, said flange having aligned apertures and means passing through said apertures to secure said insert member to said housing.

3. In a brake drum, a housing comprising two members, one of said members including a wall having an annular flange projecting therefrom, a plurality of spaced ribs on face of said flange, said ribs extending from said wall towards the outer edge of said flange, said ribs terminating in seat portions, said other member including an annular portion having a flange projecting therefrom, said member being positioned on said housing with the face of said annular portion engaging the said ribs and the inner face of said flange portion thereof engaging said seat portions of said ribs, and means passing through said ribs to secure said members together.

4. In a brake drum, a housing, said housing including a wall having an annular flange projecting therefrom, a plurality of spaced ribs on the inner face of said flange, said ribs extending from said wall towards the outer edge of said flange, said ribs terminating short of the outer edge of said flange and forming seats, a second annular flange projecting from said wall and spaced from said first flange, the inner face of said second annular flange being flush with the inner faces of said ribs, an insert member, said member including a cylindrical portion having an annular flange projecting outwardly therefrom, said insert member being positioned on said housing with the outer face of said cylindrical portion engaging said ribs and the inner face of said flange portion thereof engaging said seat ends of said housing ribs, a portion of said annular portion being in annular contact with said second annular flange of said housing and means to secure said insert member to said housing.

5. In a brake drum, a housing, said housing including a wall having an annular flange projecting therefrom, a plurality of spaced ribs on the inner face of said flange, said ribs extending from said wall towards the outer edge of said flange and being inclined with the outer ends of each of said ribs overlapping the inner ends of each succeeding rib, said ribs terminating short of the outer edge of said flange and forming seats, a second flange projecting from said wall and spaced from said first flange, the inner face of said second annular flange being flush with the inner faces of said ribs, an insert member, said member including a cylindrical portion having an annular flange projecting outwardly therefrom, said insert member being positioned on said housing with the outer face of said cylindrical portion engaging said ribs and the inner face of said flange portion thereof engaging said seats of said housing ribs, a portion of said cylindrical portion being in annular contact with said second annular flange said housing and means to secure said insert member to said housing, said housing wall having apertures therein between said ribs and between said housing flange and said second annular flange.

6. In a brake drum, a member including a wall having an annular flange projecting therefrom, a plurality of spaced ribs on the outer face of said flange, said ribs extending from said wall towards the outer edge of said flange and being arranged at an angle, with the outer ends of said ribs overlapping the inner ends of each succeeding rib, said ribs terminating short of the outer edge of said flange and forming seat portions, a second member including a wall and an annular flange projecting from said wall and spaced from said first flange, said second wall being flush with the outer faces of said ribs, and said second annular flange on engaging the outer faces of said ribs and means to secure said members together.

7. In a brake drum, a housing, said housing including an annular wall having a cylindrical portion projecting therefrom at the periphery thereof, said cylindrical portion having integral ribs thereon, said ribs terminating short of the end of said cylindrical portion to provide seats, said seats having plane faces and a removable insert, said insert including a cylindrical portion having an external diameter substantially corresponding to the internal diameter of said ribs, said insert having a flange thereon, said flange having its inner face directly engaging the seats on said ribs, the edge of said flange being fitted within the first mentioned cylindrical portion and means passing through the flange on said insert and said annular wall to hold said insert in place against longitudinal and rotational movement relative to said body.

CHARLES W. KEENE.